United States Patent

Ueda et al.

[11] Patent Number: 5,772,242
[45] Date of Patent: Jun. 30, 1998

[54] AIR BAG GAS GENERATOR

[75] Inventors: Masayuki Ueda, Hyogo; Nobuyuki Katsuda, Tokyo, both of Japan

[73] Assignee: Daicel Chemical Industries, Ltd., Osaka, Japan

[21] Appl. No.: 836,187

[22] Filed: May 8, 1997

[51] Int. Cl.$^6$ .................................................. B60R 21/28
[52] U.S. Cl. ........................... 280/741; 280/736; 102/202
[58] Field of Search ..................................... 280/741, 736; 102/530, 531, 202, 202.14; 222/3; 422/164, 167

[56] References Cited

U.S. PATENT DOCUMENTS

| | | | |
|---|---|---|---|
| 4,943,086 | 7/1990 | Cunningham | 280/741 |
| 5,273,722 | 12/1993 | Högenauer et al. | 422/164 |
| 5,468,017 | 11/1995 | Kirsch et al. | 280/741 |
| 5,613,705 | 3/1997 | Hock et al. | 280/741 |
| 5,613,706 | 3/1997 | Parker et al. | 280/741 |
| 5,642,904 | 7/1997 | Thuen et al. | 280/741 |

*Primary Examiner*—Christopher P. Ellis

[57] ABSTRACT

The present invention provides an air bag gas generator comprising a housing, an ignition means accommodation chamber defined in the said housing, a combustion chamber, a coolant/filter chamber, an ignition means provided inside said ignition means accommodation chamber, a canister provided in said combustion chamber and a coolant and a filter, provided in said coolant/filter chamber, is characterized in that another coolant is provided in said canister to cool said combustion gas and to collect combustion residue.

1 Claim, 3 Drawing Sheets

AIR BAG GAS GENERATOR

FIELD OF THE INVENTION

The present invention relates to a gas generator for an air bag used to protect a vehicle passenger(s) from an impact, and in particular to the structure of a gas canister thereof.

BACKGROUND OF THE INVENTION

Figure 6:
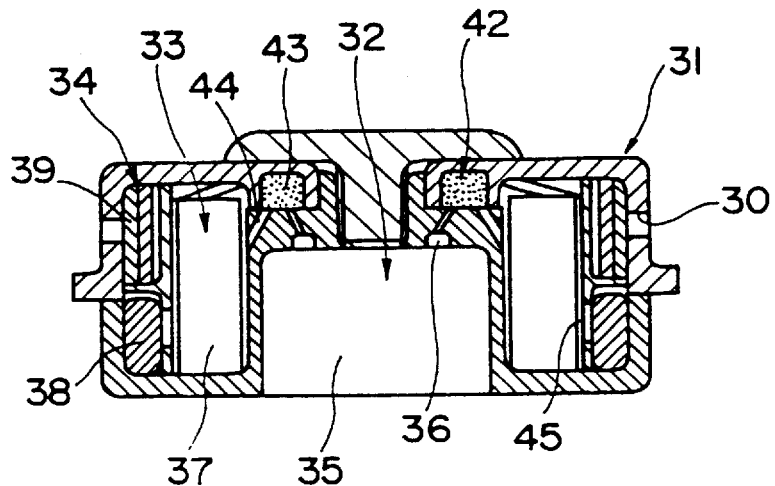
FIG. 6 is a cross-sectional view of a conventional gas generator.

A conventional air bag gas generator is shown in FIG. 6. The gas generator comprises a housing 31 having gas outlet ports 30; an ignition means accommodation chamber 32 defined in the center portion of the housing 31; a combustion chamber 33 defined outside of the ignition means accommodation chamber 32; a coolant/filter chamber 34 defined outside the combustion chamber 33; an ignition means, i.e., a mechanical sensor 35 and a detonator 36, provided in the ignition means accommodation camber 32; a canister 37, which is provided in the combustion chamber 33 and is filled with a gas generating agent 40 (FIG. 7) for generating gas upon ignition by the ignition means; and a coolant 38 and a filter 39, which are provided in the coolant/filter chamber 34 to cool and purify gas generated in the canister.

When the mechanical sensor 35 detects an impact, a pin thereof (not shown) strikes the detonator 36, which is then fired and ignites a transfer charge 43 in a transfer charge chamber 42. When the transfer charge 43 is ignited, a flame at a high temperature and with high pressure is generated. This flame is transmitted along a path 44, enters the combustion chamber 33, and breaks the wall of the canister 37, to ignite the internal gas generating agent 40. As a result, the gas generating agent 40 burns and generates gas, which enters the coolant/filter chamber 34 through ejection ports 45. While the gas passes through the coolant 38, it is cooled and combustion residue is removed out. Thereafter, when the gas is passed through the filter 39, the rest of the combustion residue is removed out, and the cooled and purified gas passes through the gas outlet ports 30 and flows into an air bag (not shown).

Upon the combustion of the gas generating agent, combustion residue, as well as the combustion gas, is generated and is carried along with the combustion gas. If the combustion gas were to flow directly into the air bag, damage to the air bag such as its burning or a formation of an hole(s), could occur. As the temperature at which the gas generating agent burns is not less than 1100° C. For these reasons, the coolant and the filter described above are employed to purify the combustion gas by cooling it and by entrapping the combustion residue.

Figure 7:
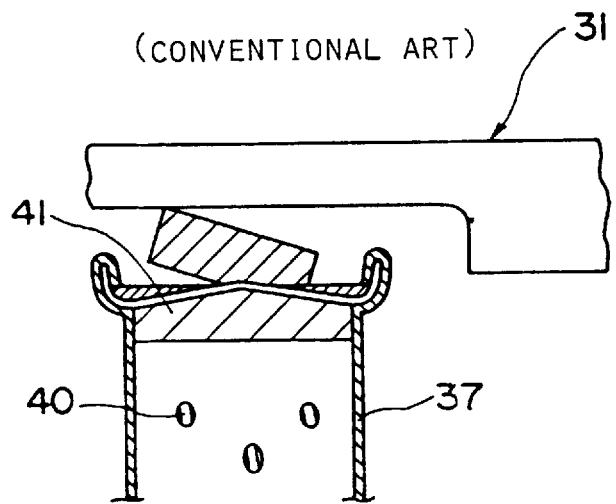
FIG. 7 is an enlarged cross-sectional view of the essential portion of the conventional gas generator.

In FIG. 7 is shown an enlarged portion of the canister 37. Cushions 41 are arranged in the canister 37. The cushions 41 restrict the movement or the vibration of the gas generating agent 40 and prevent the gas generating agent from being damaged.

In the above conventional gas generator, the provision of the coolant is limited to the coolant/filter chamber. Since the cooling and purification process for the combustion gas is centralized by the coolant that is provided at one location, a problem arises concerning the effective cooling of the combustion gas and the effective collection of the combustion residue.

The volume of the coolant must be increased to provide a satisfactory cooling effect, and consequently, the volume and the weight of the gas generator will be increased.

Although a gas generator in which a curved gas channel is formed to produce pressure loss for the combustion gas in order to improve the collection performance is proposed, the structure of this generator is complicated.

SUMMARY OF THE INVENTION

It is, therefore, one object of the present invention to provide a novel air bag gas generator that can overcome the above shortcomings of the prior art.

To achieve the above object, according to the present invention, an air bag gas generator comprises:
  a housing having gas outlet ports;
  an ignition means accommodation chamber defined in the center of the housing;
  a combustion chamber defined outside the ignition means accommodation chamber;
  a coolant/filter chamber defined outside the combustion chamber;
  an ignition means provided inside the ignition means accommodation chamber;
  a canister, provided in the combustion chamber, and filled with a gas generating agent for generating gas upon ignition by the ignition means; and
  a coolant and a filter, provided in the coolant/filter chamber to cool and purify combustion gas generated in the canister,
  wherein a coolant is provided in said canister to cool the combustion gas and to collect combustion residue.

In the gas generator of the present invention, the coolant is provided not only in the coolant/filter chamber but also in the canister. According to the present invention, the cooling of the combustion gas and the collection of the combustion residue are performed in two stages. More specifically, the combustion gas that is generated in the canister passes through the coolant in the canister while the combustion gas is cooled and the combustion residue is collected (first step). Then, the combustion gas that has been cooled and purified enters the coolant/filter chamber where it is again cooled and purified by the internal coolant (second step). Fine combustion residue that can not be collected by the coolant is effectively collected by the filter in the coolant/filter chamber.

The coolant in the canister and the coolant in the coolant/filter chamber are not necessarily formed of the same material. Although in general the coolant is shaped by putting stainless steel fibers into a knit mold, the coolant in the canister is not limited to this. Shaped one of knit ceramic fiber, a lamination of metal ring nets, or an annealed stainless steel machined fabric, may be used as the coolant in the canister.

The coolant in the canister may be a ring or a cylinder in shape. Further, it can be a ring or cylindrical coolant formed by separate pieces.

According to the present invention, since the cooling and purifying the combustion gas is carried out at two steps, the cooling and purifying the combustion gas can be effectively performed. And the volume of the coolant provided in the coolant/filter chamber can be reduced.

The coolant provided in the canister can also serve as a cushion for the gas generating agent. According to the present invention, therefore, the cushions conventionally provided in the canister can be eliminated.

The total weight of the gas generator can be reduced because of the reduction in the coolant volume and the absence of the cushions, and a compactness of the gas generator can be achieved.

Furthermore, the gas generator of the present invention can be applied for a non-silicon coated bag because the process of the cooling and purifying the combustion gas is effectively carried out.

THE BEST MODES FOR CARRYING OUT THE INVENTION

One embodiment of the present invention will now be described while referring to the drawings.

Figure 1:
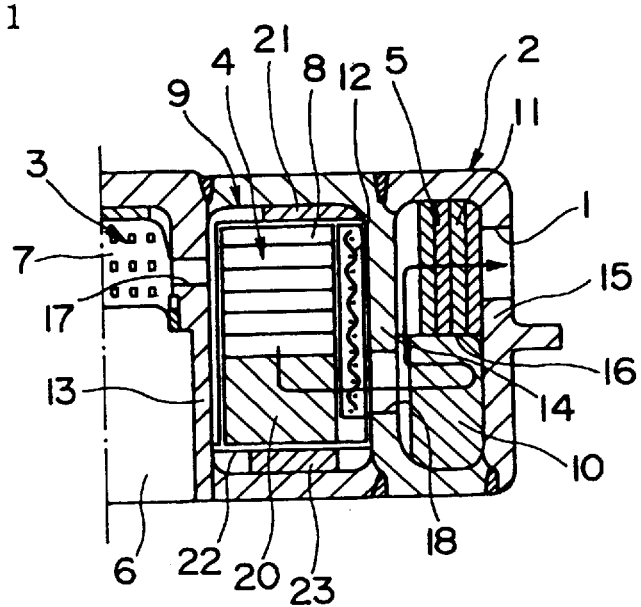
FIG. 1 is a half cross-sectional view of a gas generator according to one embodiment of the present invention.

FIG. 1 is a half cross-sectional view of a gas generator according to the present invention. The gas generator comprises: a housing 2 having gas outlet ports 1; an ignition means accommodation chamber 3 defined in the center of the housing 2; a combustion chamber 4 defined outside the ignition means accommodation chamber 3; a coolant/filter chamber 5 defined outside the combustion chamber 4; an ignition means, i.e., an ignitor 6 and a transfer charge 7, provided in the ignition means accommodation chamber 3; a canister 9 which is provided in the combustion chamber 4 and is filled with gas generating agents 8 for generating gas upon its ignition by the ignition means; and a coolant 10 and a filter 11 provided in the coolant/filter chamber 5 to cool and purify the combustion gas generated in the canister.

The ignition means accommodation chamber 3 is defined by a central cylinder 13, and the combustion chamber 4 is defined by the central cylinder 13 and an internal cylinder 14 enclosing the central cylinder. The coolant/filter chamber 5 is defined by the internal cylinder 14 and an external wall 15 enclosing the internal cylinder. The coolant/filter chamber 5 is divided into an upper portion and a lower portion by a retainer 16.

Channels 17 are provided between the ignition means accommodation chamber 3 and the combustion chamber 4 to convey, to the combustion chamber 4, a flame that is generated in the ignition means storage camber 3. A plurality of ejection ports 18, through which the combustion gas generated in the combustion chamber 4 is ejected, are formed in the direction of the circumference between the combustion chamber 4 and the coolant/filter chamber 5. In addition, a plurality of outlets 1 are formed in the direction of the circumference between the coolant/filter chamber 5 and an air bag (not shown).

The canister 9 has a coolant 20 internally for cooling the combustion gas generated by the combustion of the gas generating agents 8, and for entrapping combustion residue. The coolant 20 is ring shaped, and is located adjacent to the ejection ports 18. In addition to the above described functions, the coolant 20 also serves as a cushion to restrict the movement or the vibration of the gas generating agents 8, and to prevent damage to the gas generating agent.

Figure 2:
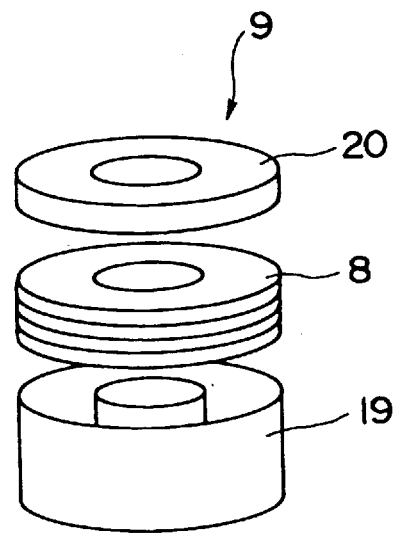
FIG. 2 is an exploded perspective view of the essential portion of a canister provided for the said gas generator.

As is shown in FIG. 2, the canister 9 has a thin aluminum external container 19 defining a ring shaped space. To form the canister 9, the components are assembled in the external container 19 in the following order. A cushion 21 (FIG. 1) having a ring shape is provided at the bottom of the external container 19, then, a pre-filter 12 having a cylindrical shape, is provided, and the gas generating agents 8 which are disk shaped are laminated inside the pre-filter 12. Instead of the disk shaped gas generating agents mentioned here, those shaped like a pellet can be used. And the coolant 20 which is ring shaped is positioned on the gas generating agents 8, and finally, the canister is sealed off air by a cover 22. The thus assembled canister 9 is provided with a cushion 23 in the combustion chamber 4.

In the thus structured gas generator of the present invention, when a sensor (not shown) detects an impact, it transmits a signal to the ignitor 6, which in turn is activated and fires the transfer charge 7, thereby generating a flame at a high temperature. This flame passes through the channels 17 and enters the combustion chamber 4, breaks the wall of the external container 19 of the canister, and ignites the gas generating agents 8 therein. The gas generating agents 8 burn and generate gas. While the gas is passing through the pre-filter 12, the combustion residue is removed out. While the gas is passing through the coolant 20, it is cooled and the combustion residue is removed out. The combustion gas that is cooled and purified is ejected to the coolant/filter chamber 5 through the ejection ports 18. While passing through the coolant 10, the combustion gas is further cooled and combustion residue is removed out, and while passing through the filter 11, the rest of the combustion residue is removed out. The combustion gas is cooled and purified in the combustion chamber 4 at the first step, and is further cooled and purified in the coolant/filter chamber 5 at the second step. The resultant gas enters an air bag (not shown) through the gas outlet ports 1, and inflates the air bag. As a result, a cushion is formed between an passenger and a hard structure and protects the passenger from an impact.

Figure 3:
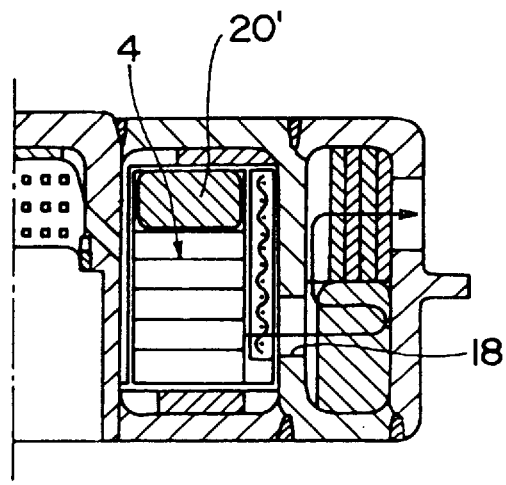
FIG. 3 is a half cross-sectional view of a gas generator according to another embodiment of the present invention.

FIG. 3 is a diagram illustrating a gas generator according to another embodiment of the present invention. In this case, a coolant 20' is located at the opposite side of that shown in FIG. 1, and is located away from ejection ports 18. When the gas generator is activated, the combustion gas enters the coolant 20', strikes the ceiling wall of a combustion chamber 4, again enters the coolant 20', and is ejected through ejection ports 18. According to this embodiment, the combustion gas reciprocates through the coolant and is effectively cooled and purified by the coolant.

Figure 4:
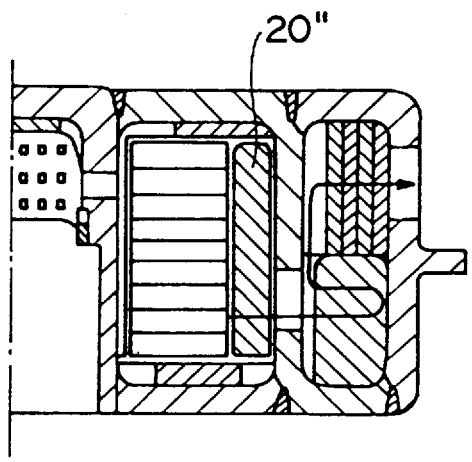
FIG. 4 is a half cross-sectional view of a gas generator according to an additional embodiment of the present invention.

In FIG. 4 is shown a gas generator according to an additional embodiment of the present invention. In this embodiment, a coolant 20" is formed in a cylindrical shape, and is located, as a substitute of a pre-filter, at the position where the pre-filter 12 is located in FIG. 1. In contrast to the structures shown in FIGS. 1 and 3, the structure in this embodiment can eliminate the prefilter, and the quantity of the gas generating agent can be increased.

Figure 5:
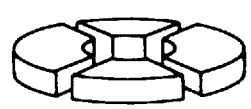
FIG. 5 is a perspective view of a coolant that can be applied for the gas generator of the present invention.

In FIG. 5 is shown a coolant having a ring shape that is formed by separate pieces. When the number of separate pieces is controlled, the volume of the coolant can be easily controlled. Therefore, the volume of the gas generating agent can be controlled in the same canister container, and accordingly, the volume of the coolant can be controlled, so that various canisters of which outputs are different from one another can be easily assembled.

What is claimed is:

1. An air bag gas generator comprising:

a housing having gas outlet ports;

an ignition means accommodation chamber defined in the center of said housing;

a combustion chamber defined outside said ignition means accommodation chamber;

a coolant/filter chamber defined outside said combustion chamber;

an ignition means provided inside said ignition means accommodation chamber;

a canister provided in said combustion chamber and filled with a gas generating agent for generating gas upon ignition by said ignition means; and a coolant and a filter, provided in said coolant/filter chamber to cool and purify combustion gas generated in said canister, wherein another coolant is provided in said canister to cool said combustion gas and to collect combustion residue.

* * * * *

UNITED STATES PATENT AND TRADEMARK OFFICE
CERTIFICATE OF CORRECTION

PATENT NO. : 5,772,242
DATED : June 30, 1998
INVENTOR(S) : M. UEDA, et. al.

It is certified that error appears in the above-identified patent and that said Letters Patent is hereby corrected as shown below:

Title page, PCT should read as following:

[22]  Filed:      May 8, 1997
[86]  PCT No:     PCT No: PCT/JP95/01820
      § 371 Date:       May 8, 1997
      § 102(e) Date:    May 8, 1997
[87]  PCT Pub. No.:  WO97/10127
      PCT Pub. Date: Mar. 20, 1997

Signed and Sealed this

Thirtieth Day of March, 1999

Attest:

Q. TODD DICKINSON

*Attesting Officer*           Acting Commissioner of Patents and Trademarks